(12) United States Patent
Tschirhart et al.

(10) Patent No.: US 11,936,804 B2
(45) Date of Patent: *Mar. 19, 2024

(54) METHOD AND SYSTEM FOR ROUTING OF INBOUND TOLL-FREE COMMUNICATIONS

(71) Applicant: Level 3 Communications, LLC, Broomfield, CO (US)

(72) Inventors: David A. Tschirhart, Dale, TX (US); Ken Shomaker, Powell, OH (US)

(73) Assignee: Level 3 Communications, LLC, Broomfield, CO (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/720,987

(22) Filed: Apr. 14, 2022

(65) Prior Publication Data

US 2022/0239784 A1 Jul. 28, 2022

Related U.S. Application Data

(63) Continuation of application No. 16/998,544, filed on Aug. 20, 2020, now Pat. No. 11,316,983, which is a
(Continued)

(51) Int. Cl.
*H04W 40/04* (2009.01)
*H04M 15/00* (2006.01)
*H04M 15/08* (2006.01)

(52) U.S. Cl.
CPC ....... *H04M 15/8044* (2013.01); *H04M 15/08* (2013.01); *H04M 15/09* (2013.01); *H04W 40/04* (2013.01)

(58) Field of Classification Search
CPC .. H04M 15/8044; H04M 15/09; H04M 15/08; H04M 15/00; H04M 40/04;
(Continued)

(56) References Cited

U.S. PATENT DOCUMENTS 6,430,277 B1 * 8/2002 Roadifer ............... H04M 15/00
379/127.02
6,748,064 B2 6/2004 Zbib
(Continued)

OTHER PUBLICATIONS

International Preliminary Report on Patentability dated Mar. 13, 2018, Int'l Appl. No. PCT/US16/043162, Int'l Filing Date Jul. 20, 2016; 7 pgs.
(Continued)

*Primary Examiner* — Khawar Iqbal

(57) ABSTRACT

Aspects of the present disclosure involve systems, methods, computer program products for consolidating toll-free features of two or more telecommunications networks. In one implementation, the network services may be consolidated through utilization of an Enhanced Feature Server (EFS) or other type of application server deployed in a telecommunications network. The EFS may be configured to receive a toll-free communication and route the communication based on the dialed toll-free number and a carrier identification code (CIC) associated with the communication. Routing the communication based at least on the CIC associated with the communication allows the telecommunications network to consolidate (and ultimately remove) a redundant network or network components from the telecommunications network to improve the operation of the network. In circumstances where a CIC is not associated with a communication, the EFS may request a data schema from a national toll-free number database and determine a CIC for the communication based on an analysis of the data schema.

17 Claims, 12 Drawing Sheets

Related U.S. Application Data continuation-in-part of application No. 16/390,713, filed on Apr. 22, 2019, now abandoned, which is a continuation of application No. 14/851,297, filed on Sep. 11, 2015, now Pat. No. 10,270,917.

(60) Provisional application No. 63/057,719, filed on Jul. 28, 2020.

(58) Field of Classification Search
CPC ...... H04W 40/04; H04L 45/00; H04L 45/304; H04L 45/42; H04Q 3/0045; H04Q 3/0025
See application file for complete search history.

(56) References Cited

U.S. PATENT DOCUMENTS

| | | | |
|---|---|---|---|
| 8,180,039 B2 | 5/2012 | Bedingfield, Sr. | |
| 8,570,873 B2 | 10/2013 | Lawson et al. | |
| 8,848,890 B2 | 9/2014 | Gupta et al. | |
| 8,908,850 B2 | 12/2014 | Allen | |
| 9,178,720 B2 | 11/2015 | Tang | |
| 9,219,677 B2 * | 12/2015 | McCann | H04L 45/42 |
| 9,247,043 B1 | 1/2016 | Schaff | |
| 9,288,333 B2 * | 3/2016 | Bishop | H04M 7/0084 |
| 9,392,123 B1 | 7/2016 | Yin | |
| 9,398,163 B2 | 7/2016 | Ku | |
| 9,712,341 B2 * | 7/2017 | Nas | H04L 61/4557 |
| 10,116,803 B1 * | 10/2018 | Vigen | H04M 15/09 |
| 2008/0279354 A1 * | 11/2008 | Terpstra | H04M 3/42306 379/114.24 |
| 2010/0158201 A1 | 6/2010 | Marathe | |
| 2010/0202446 A1 | 8/2010 | McCann | |
| 2011/0286446 A1 | 11/2011 | Guerra | |
| 2013/0010932 A1 | 1/2013 | Bajpay | |
| 2013/0177142 A1 | 7/2013 | Allen | |
| 2014/0269679 A1 | 9/2014 | Gillis | |
| 2015/0103991 A1 | 4/2015 | Albert | |
| 2015/0296436 A1 | 10/2015 | Terpstra et al. | |
| 2015/0350426 A1 | 12/2015 | Huang | |
| 2015/0358459 A1 | 12/2015 | Spievak | |
| 2015/0381547 A1 | 12/2015 | Mandanapu | |
| 2016/0028899 A1 | 1/2016 | Xiao | |
| 2016/0127552 A1 | 5/2016 | Sharma | |
| 2016/0127562 A1 | 5/2016 | Chauhan | |
| 2016/0127566 A1 | 5/2016 | Sharma | |
| 2016/0139998 A1 | 5/2016 | Dunn | |
| 2016/0142447 A1 | 5/2016 | Mufti | |
| 2016/0149923 A1 | 5/2016 | Zhang | |
| 2016/0182726 A1 * | 6/2016 | Frey | H04M 3/56 379/202.01 |
| 2016/0234284 A1 | 8/2016 | Bao | |
| 2017/0064091 A1 | 3/2017 | Aldworth | |
| 2017/0064523 A1 * | 3/2017 | Aldworth | H04M 15/8061 |
| 2017/0078495 A1 | 3/2017 | Tschirhart | |
| 2018/0020102 A1 | 1/2018 | Aldworth | |
| 2018/0027129 A1 | 1/2018 | Sharm | |
| 2018/0109664 A1 * | 4/2018 | Haltom | H04M 3/527 |
| 2019/0245981 A1 | 8/2019 | Tschirhart | |
| 2019/0335533 A1 * | 10/2019 | Combellas | H04W 4/90 |
| 2020/0382652 A1 | 12/2020 | Tschirhart | |
| 2021/0352478 A1 * | 11/2021 | Hauser | H04W 12/72 |
| 2023/0136732 A1 * | 5/2023 | Sharma | H04L 45/125 379/112.09 |

OTHER PUBLICATIONS

International Search Report dated Nov. 7, 2016, Int'l Appl. No. PCT/US16/043162, Int'l Filing Date Jul. 20, 2016; 3 pgs.

Written Opinion of the International Searching Authority dated Nov. 7, 2016, Int'l Appl. No. PCT/US16/043162, Int'l Filing Date Jul. 20, 2016; 5 pgs.

* cited by examiner

METHOD AND SYSTEM FOR ROUTING OF INBOUND TOLL-FREE COMMUNICATIONS

FIELD OF THE DISCLOSURE

Embodiments described herein generally relate to systems and methods for implementing a telecommunications network, and more specifically, to consolidating toll-free services while minimizing the impact to customers.

BACKGROUND

Telecommunication networks provide for the transmission of information across some distance through terrestrial, wireless or satellite communication networks. Such communications may involve voice, data, multimedia information, etc. In addition, telecommunication networks often offer features and services to the customers of the network that provide flexible and varied ways in which the communications are transmitted over the network. For example, some telecommunication networks provide toll-free communications in which a called customer may pay for the incoming telephone calls made to the customer or the customer's network. Toll-free communications allow a customer to the network to receive calls from disparate locations around the country without passing the cost of such long-distance calls to the customer.

Many telecommunication companies, through acquisitions and mergers with other telecommunication entities, may maintain distinct networks for providing such toll-free services to customers of the company. However, managing distinct networks provide several challenges to the telecommunication company. For example, provisioning procedures for each network may be different requiring network managers for the telecommunication company to learn the different provisioning procedures. Each network may provide different features for the company's customers, but all such features may not be available in every region of the network footprint. Thus, to provide such services to the customers, the network managers may route communications from one distinct network to the other, which may in turn consume valuable network resources. Thus, it is often advantageous to combine, as much as possible, distinct networks into a single managed network when additional networks or network resources are obtained through such acquisitions.

It is consideration of these and other issues that various aspects of the present disclosure were developed.

SUMMARY

One implementation of the present disclosure may take the form of a telecommunications network. The network comprises at least one application server for receiving communications from a plurality of telecommunication networks, the at least one application server comprising instructions stored thereon that, when executed by the at least one application server, perform several operations. Such operations may include receiving an incoming communication comprising a dialed telephone number associated with a client of the telecommunications network, obtaining the dialed telephone number from the incoming communication, determining a carrier identification code (CIC) associated with the dialed telephone number, identifying a destination device of the client of the telecommunication network, the destination device in communication with at least one of the plurality of telecommunication networks, and transmitting the incoming communication to the destination device of the client of the telecommunication network through the at least one of the plurality of telecommunication networks.

Another implementation of the present disclosure may take the form of a feature server. The feature server comprises at least one network interface for receiving communications from a plurality of telecommunication networks, and a processor. The processor may obtain the dialed telephone number from the incoming communication, request information from a CIC data source associated with the dialed telephone number, receive a data schema associated with the dialed telephone number, analyze the data schema, determine a CIC to associate with the dialed telephone number based on the analysis of the data schema associate the determined CIC with the at least one incoming communication, and wherein the processing device is in communication with a routing table database comprising a correlation of the dialed telephone number and the determined CIC from the at least one incoming communication with a destination device of the client of the telecommunication network; and identify the destination device of the client of the telecommunication network based at least on the dialed telephone number and the determined CIC. Then, a transmitting component can transmit the at least one incoming communication to the destination device of the client of the telecommunication network through at least one of the plurality of telecommunication networks.

Another implementation of the present disclosure may take the form of a method for operating a telecommunications network. The method comprises receiving an incoming communication at an application server for receiving communications from a plurality of telecommunication networks, the incoming communication comprising a dialed telephone number associated with a client of the telecommunications network and without a carrier identification code (CIC), obtaining the dialed telephone number from the incoming communication, requesting information from a CIC data source associated with the dialed telephone number, receiving a data schema associated with the dialed telephone number, wherein the data schema includes two or more CICs associated with the dialed telephone number, analyzing the data schema, determining one of the two or more CICs to associate with the dialed telephone number based on the analysis of the data schema, associating the determined CIC with the incoming communication, identifying a destination device of the client of the telecommunication network based at least on the dialed telephone number and the determined CIC, the destination device in communication with at least one of the plurality of telecommunication networks, and transmitting the incoming communication to the destination device of the client of the telecommunication network through the at least one of the plurality of telecommunication networks.

DETAILED DESCRIPTION

Aspects of the present disclosure involve systems, methods, computer program products, and the like, for consolidating toll-free features of two or more telecommunications networks into fewer telecommunications networks. In one implementation, the network services may be consolidated through utilization of an application server, referred to as an Enhanced Feature Server (EFS), deployed in at least one of the telecommunications network. The EFS may be configured to receive a toll-free communication and route the communication based on the dialed toll-free number and a carrier identification code (CIC) associated with the communication. The CIC associated with the communication may identify a previous telecommunications network to which a customer was connected before that telecommunications network was consolidated and eliminated in the system. By routing the communication in this manner, the EFS may identify the customer from the dialed toll-free number and a particular network connection from the CIC. Examples of methods and systems for routing based on the CIC are provided in U.S. Pat. No. 10,270,917, which is incorporated by reference in its entirety herein for all that it teaches and for all purposes.

Routing the communication based at least on the CIC associated with the communication allows the telecommunications network to consolidate (and ultimately remove) a redundant network or network components from the telecommunications network to improve the operation of the network. Also, routing the communication based at least on the CIC associated with the communication improves operations of the consolidated networks or components. In circumstances where a CIC is not already associated with a communication, the EFS may retrieve a CIC associated with the toll-free number from a database, to associate the CIC with the communication for determining the routing. The retrieved and assigned CIC may consider load balancing or other factors based on information provided from the database. For example, other identifiers or information associated with the communication or toll-free number, such as originating or destination Internet Protocol (IP) address, originating or destination Trunk Group (TG) address, zone-based information, percent allocation, local access and transport area (LATA) information, and the like, may be used to route the toll-free communication. The routing decision may be a multifactor decision using two or more of the above or other items of information.

Figure 1:
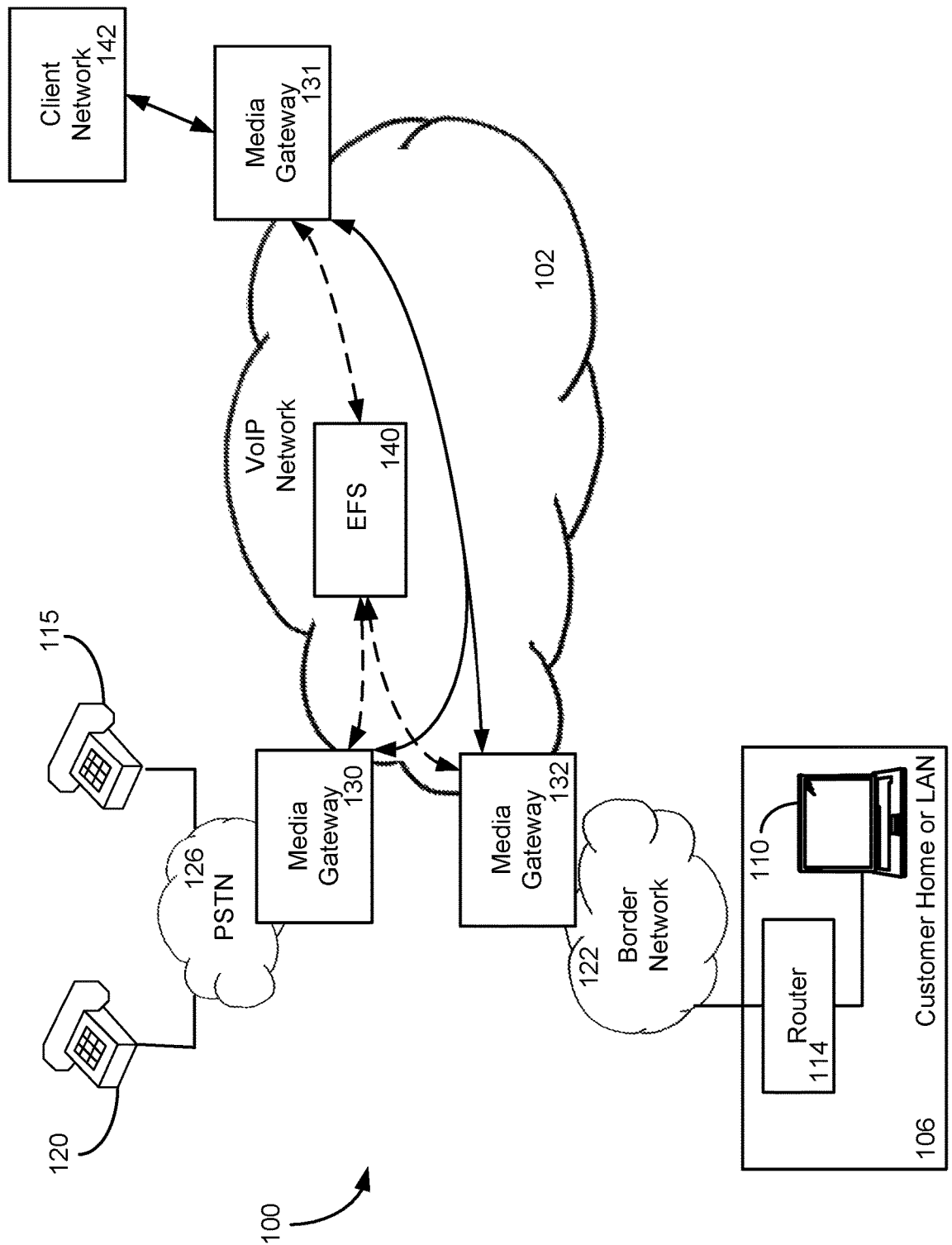
FIG. 1 is a schematic diagram illustrating a telecommunications network operating environment in accordance with embodiments of the present disclosure.

FIG. 1 illustrates an exemplary operating environment 100 for providing toll-free services to one or more customers of a telecommunications network. The environment 100 provides for establishing communication sessions between network users. With specific reference to FIG. 1, the environment 100 can include a VoIP network 102, which may be provided by a network service provider (NSP). However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any telecommunication network devices known or hereafter developed.

The VoIP network 102 includes numerous components such as, but not limited to gateways, routers, and registrars, which enable communication across the VoIP network 102, but are not shown or described in detail here because such devices and network configurations are readily understood by those of skill in the particular art. More relevant to this description is the interaction and communication between the VoIP network 102 and other entities, such as the one or more customer home or business local area networks (LANs) 106, where a user of the network will connect with the network and, more particularly, an EFS 140 connected to or instantiated in the network.

Customer network 106 can include communication devices such as, but not limited to, a personal computer or an IP-based telephone device 110 connected to a router/firewall 114. Although shown in FIG. 1 as computer 110, the communication devices may include any type of communication device that receives a multimedia signal, such as an audio, video, or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home-based or business-based, but the components can be relocated and may be designed for easy portability. For example, the communication device 110 may be wireless (e.g., cellular) telephone, smart phone, tablet or portable laptop computer. Other communication devices 115,120 (such as analog telephones or other communication devices) may connect to the network 102 through a public switched telephone network (PSTN) for providing communications to the network.

The customer network 106 typically connects to the VoIP network 102 via a border network 122 or access network, such as one provided by an Internet Service Provider (ISP). The border network 122 is typically provided and maintained by a business or organization such as a local telephone company or cable company. The border network 122 may provide network/communication-related services to their customers. In contrast, the communication device 120,115 accesses, and is accessed by, the VoIP network 102 via the PSTN 126 operated by a local exchange carrier (LEC). Communication via any of the networks can be wired, wireless, or any combination thereof. Additionally, the border network 122 and PSTN 126 may communicate, in some configurations, with the VoIP Network 102 through a media gateway device (130, 132). For ease of description, only three communication devices 110, 115, 120 are shown communicating with the VoIP network 102; however, numerous such devices, and other devices, may be connected with the network 102, which is equipped to handle substantial numbers of simultaneous calls and other communications.

A user of the network 102 can utilize one or more of the communication devices to transmit a communication to the network 102. For example, the user may place a telephone call to the network 102, from a telephone 120 associated with the network through the PSTN 126 and media gateway 130. In another example, the user may place a telephone call to the network 102 from an IP-based communication device 110 associated with the network through the border network 122 and the media gateway 132. Upon receipt, the network 102 routes the communication to a routing device 140, or routing devices, integrated within the network 102. The routing device 140 may be an EFS 140 type device. The EFS 140 may be, for example, a virtual machine executed on one or more computing devices in the network 102. The virtual EFS 140 may be executed on one or more application servers integrated into the network 102. It should be appreciated that the virtual EFS 140 may be a part of the network 102, may be separate from the network, or may have portions deployed in the network and out of the network. The EFS 140 may be resident on one or more components of the VoIP network 140, including several instances of the EFS 140 integrated throughout the network 102. Although only a single instance of an EFS 140 is illustrated in FIG. 1, any number of routing devices 140 may be present in the network 102. Further, it should be noted that the EFS 140 can also represent a separate hardware device, for example, a dedicated server or other computing device. The operation of the EFS 140 in relation to received communications is discussed in more detail below.

Figure 2:
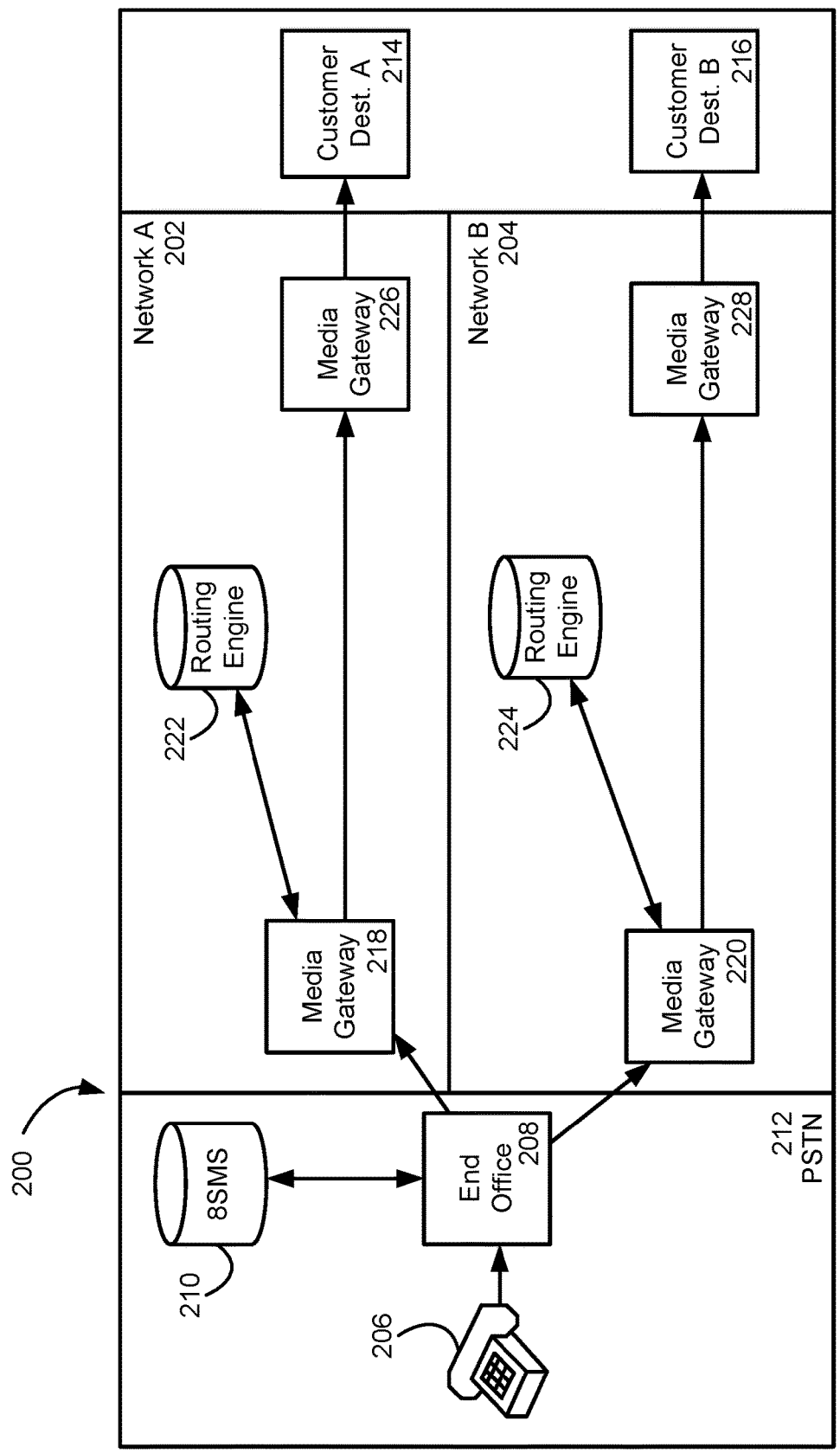
FIG. 2 is a schematic diagram illustrating two portions of the telecommunications network for providing toll-free communication services to one or more customers of the network in accordance with embodiments of the present disclosure.

As discussed above, a telecommunications company may operate more than one such telecommunications network as that illustrated in FIG. 1. For example, FIG. 2 is a schematic diagram illustrating two telecommunications networks that may be managed by a telecommunications company for providing toll-free communication services to one or more customers of the company. Although discussed as two distinct networks, it should be appreciated that the networks 202, 204 may be portions of an overall telecommunications network 200 that are distinct, in that each network may include features or provisioning protocols that are unique to the individual network. In one example, network A 202 may be obtained by a first telecommunications company through an acquisition of another telecommunications company, while network B 204 is the original network developed by the telecommunications company. Network A 202 may include a first set of features and provisioning procedures developed by the acquired company, while network B 204 may include a second set of features and provisioning procedures developed by the telecommunications company. However, both networks 202, 204 may be integrated or otherwise considered a portion of an overall telecommunications network 200 of the telecommunications company.

The telecommunications network 200, of FIG. 2, can include the same or similar components as that described above with reference to FIG. 1. For example, the network 200 may include a PSTN 212 operated by one or more LECs. The PSTN 212 can include at least one communication device 206 for originating and receiving a communication of the network 200. A user of the communication device 206 can originate a toll-free communication by dialing a toll-free number with the communication device. The communication may be transmitted to an end office 208 that is configured to route local communications to one or more long-distance networks 202, 204. In the example of a toll-free communication, the end office 208 may access a database 210 of toll-free communication information, referred to herein as the "8SMS" database, to determine to which long-distance network 202, 204 the communication is to be routed.

In general, the 8SMS database 210 receives the dialed toll-free number from the end office 208 and returns a CIC that the 8SMS database associates with the dialed number. The CIC can identify which long-distance network 202, 204 the communication is to be routed by the end office 208. In this manner, the database 210 translates the dialed number into a CIC for transmission along a long-distance network. Further, the 8SMS database 210 may also perform some processing of the dialed number to determine the CIC to provide to the end office 208 in return. For example, customer destination A 214 and customer destination B 216 may be managed by the same customer entity but may receive communications from the network 200 at different locations or through different egress trunks (illustrated in FIG. 2 by customer destination A connecting to network A 202 and customer destination B connecting to network B 204). Further, either customer destination A 214 or customer destination B 216 may be reached with the same dialed toll-free number. The 8SMS database 210 may be configured to provide a CIC to the end office 208 based on more than just the dialed number. In one example, the database 210 may be programmed to return a first CIC if the origination location is from a first area and a second CIC if the origination location of the communication is from a second area. In another example, the 8SMS database 210 may perform a load balancing feature for all incoming communications for a customer to spread out the communications over the customer's destinations 214, 216. The 8SMS database 210 may alternate between providing different CICs to the end office 208 to spread out the incoming communications. Regardless of the operations performed, the 8SMS database 210 determines which CIC to return to the end office 208 in response to receiving a dialed toll-free number and transmits the CIC to the end office 208 for further routing of the communication.

Depending on which CIC is returned, the end office 208 connects the communication to the media gateway 218 of network A 202 or the media gateway 220 of network B 204. Although illustrated in FIG. 2 and discussed below as being transmitted to either network A 202 or network B 204, it should be appreciated that the communication is routed to any number of networks within the overall telecommunications network 200. Although illustrated as being separate networks 202, 204, it should be appreciated that the networks are only separated logically within the telecommunications network 200 such that one or more of the components of the networks may be shared for routing communications through the network 200.

Upon receiving a communication from the PSTN 212, the ingress media gateway 218, 220 queries a routing engine 222, 224 to determine how to route the communication through the respective network 292, 204. The routing engine 222, 224 may be configured to receive one or more communications, determine a destination customer, a destination network, or communication device to which the toll-free communication is intended, and provide a translation of the incoming communication into a destination address associated with the network. The communication can be associated with a particular client or customer of the network 200 such that a destination address for the communication can be determined from the incoming communication. Thus, the routing engine 222, 224 may include a database that correlates information, included with the toll-free communication, with a destination network 214, 216. The routing engine 222, 224 may then respond to receiving the communication by providing one or more instructions to re-route the communication to a corresponding egress media gateway 226, 228. In a Session Initiation Protocol (SIP) based network, the routing engine 222, 224 may provide one or more SIP contacts to route the communication to the egress media gateway 226, 228. The ingress media gateway 218, 220 may then transmit the communication to an egress media gateway 226, 228 associated with the client destination 214, 216 for connection with the client network. Once connected, the originating communication device 206 and the destination customer 214, 216 may exchange communications through the network 200.

The routing engine 222, 224 for each of the networks 202, 204 route a toll-free communication based on the dialed telephone number. The routing engine 222 for network A 202 may route the communication to customer destination A 214 based on the dialed telephone number associated with the customer destination. Similarly, the routing engine 224 for network B 204 may route the communication to customer destination B 216 based on the dialed telephone number associated with the customer destination. Further, in some implementations of the network 200, a disaster recovery feature may be provided to a customer. The disaster recovery feature can allow each routing engine 222, 224 to be configured to route the toll-free communication when received at the network. The 8SMS database 210 may be programmed to route a received communication for the customer to network A 202. However, if network A 202 becomes unavailable for some reason, the 8SMS database 210 may be reconfigured to route received communications for the customer to network B 204. A backup network or transmission path through the network 200 is provided in instances of one of the transmission paths being unavailable for transmission of the communication because the routing engine 224 for network B 204 may also route the incoming communication to the customer.

Figure 3A:
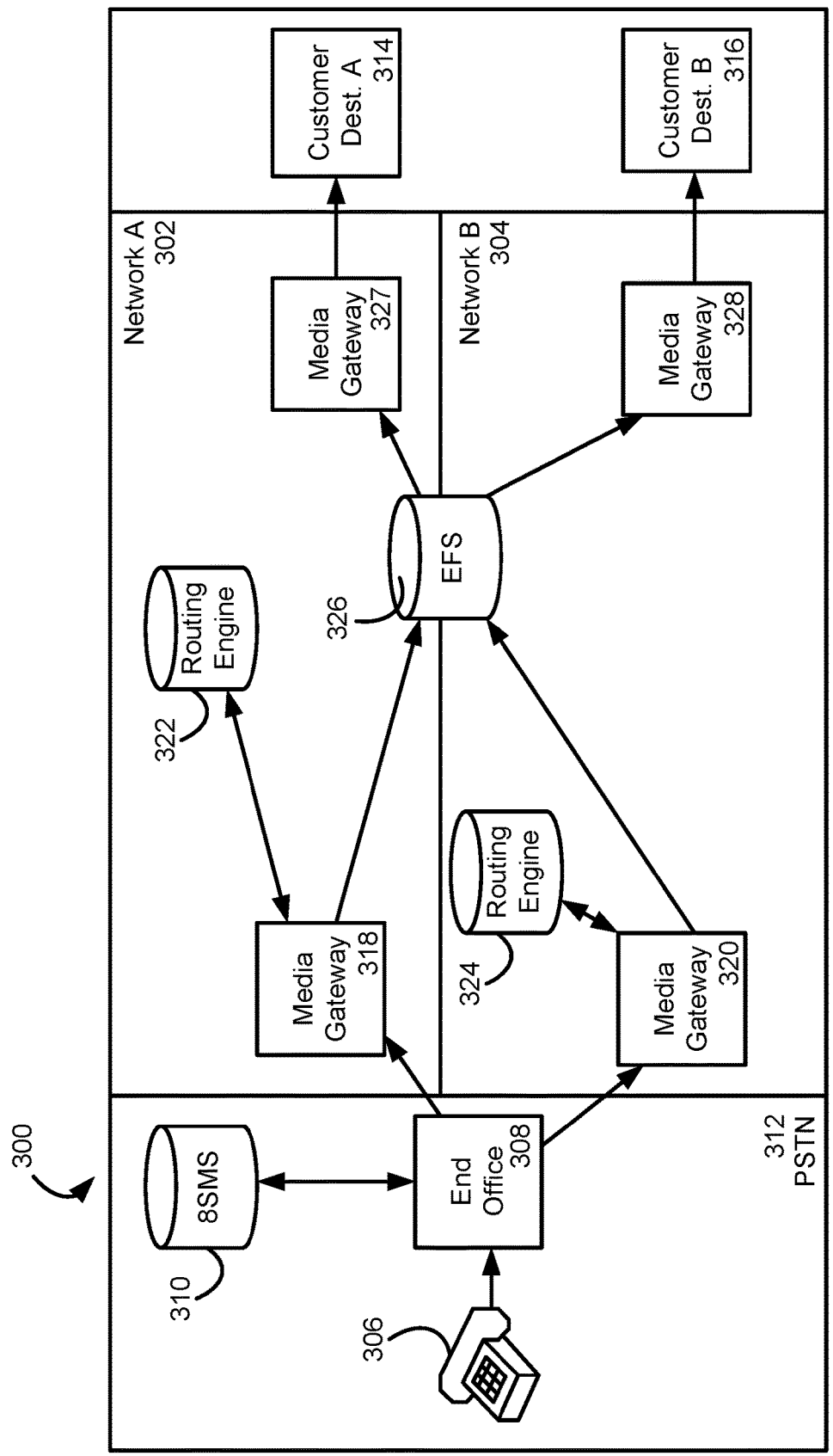
FIG. 3A is a schematic diagram illustrating a telecommunications network configuration utilizing a shared component to consolidate two or more telecommunications networks for providing toll-free communication services to one or more customers of the network in accordance with embodiments of the present disclosure.

It may be beneficial to some networks to consolidate distinct networks 202, 204 managed or maintained by the same entity. For example, FIG. 3A is a schematic diagram illustrating a telecommunications network configuration 300 utilizing a shared component 326 to consolidated two or more telecommunications networks for providing toll-free communication services to one or more customers of the network 300. The components of the network 300 of FIG. 3 are similar in operation to those described above with reference to FIG. 2. However, in this implementation, the routing engines 322, 324 route incoming toll-free communications to a shared application server, or EFS 326. The routing engines 322, 324 may be configured by a network 300 manager to route the communications to the EFS 326 based on the dialed telephone number of the communication. The EFS 326, in turn, may route the received communications to the respective egress media gateways 327, 328, also based on the dialed telephone number and, in some instances, apply one or more toll-free features to the communication. Further, the EFS 326 may consider a CIC, associated with the communication, to determine to which egress media gateway 327, 328 the communication is routed.

Figure 3B:
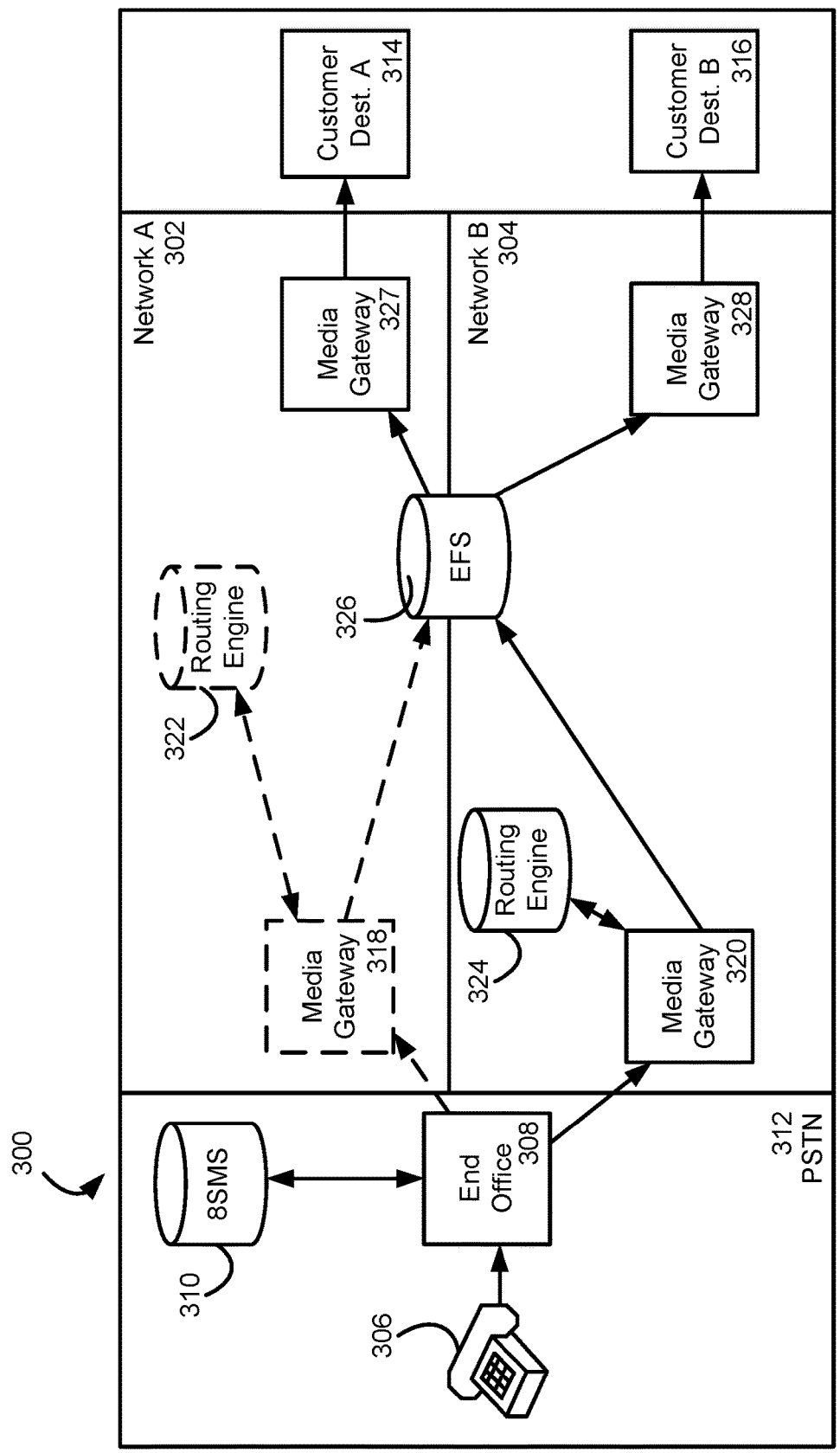
FIG. 3B is a schematic diagram illustrating a consolidated telecommunications network for providing toll-free communication services to one or more customers of the network in accordance with embodiments of the present disclosure.
Figure 3C:
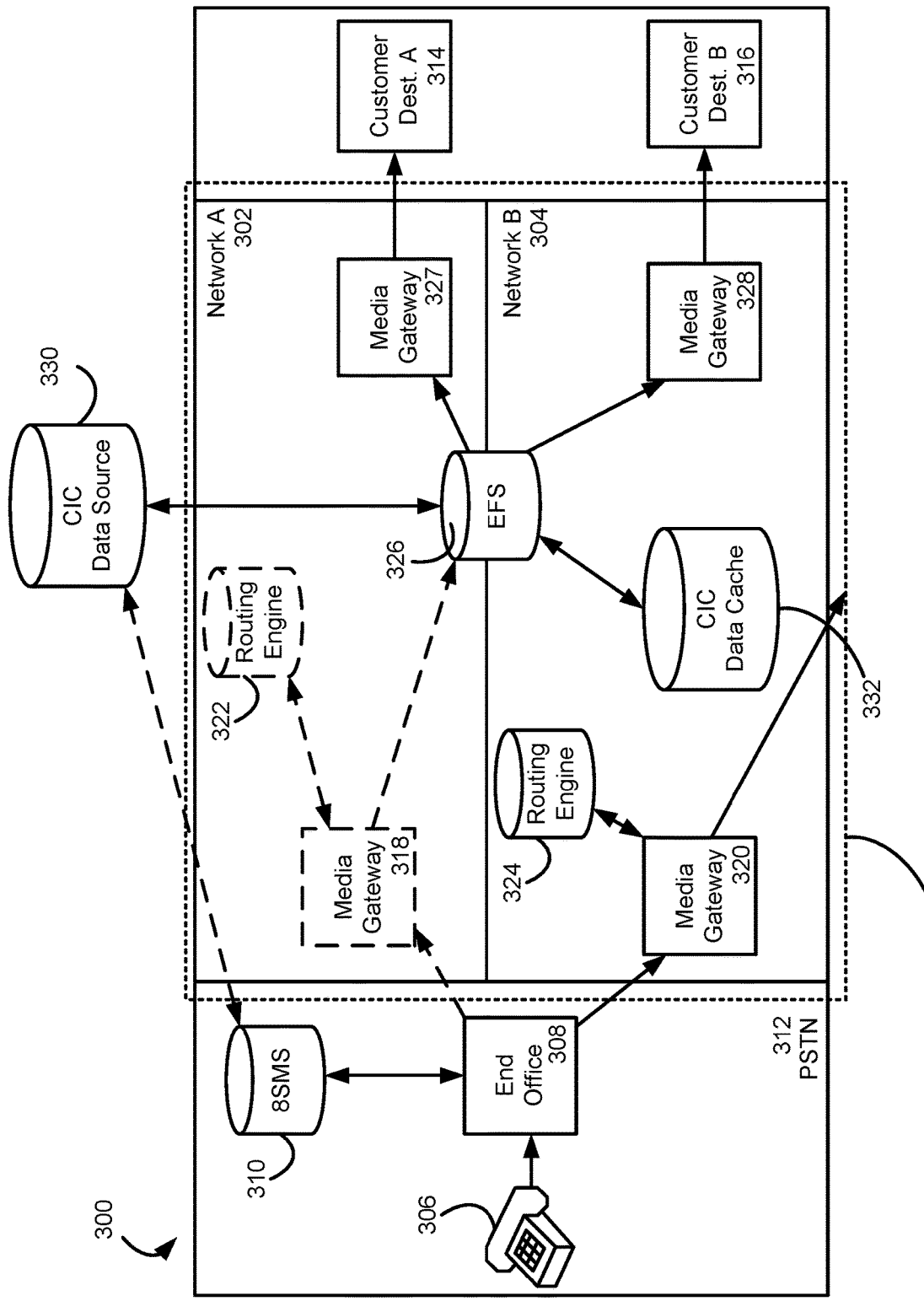
FIG. 3C is another schematic diagram illustrating a consolidated telecommunications network for providing toll-free communication services to one or more customers of the network in accordance with embodiments of the present disclosure.

Toll-free communications received on either network 302, 304 may be routed to the shared EFS 326 regardless of the CIC returned by the 8SMS database 310. Thus, the shared EFS 326 may be a component of the overall telecommunications network 300 managed by a telecommunications company that is accessible by both network A 302 and network B 304 to route communications. Routing toll-free communications to the shared EFS 326 allows the company to collapse or consolidate the networks 302, 304 into a single managed telecommunications network 300, as shown in FIG. 3C. Through the shared EFS 326, communications received through network A 302 may be provided to network B 304, and vice versa. Several methods for the EFS 326 to handle the communications from the networks in communication with the EFS are described below. Further, although discussed herein with reference to toll-free communications, it should be appreciated that any type of communications transmitted through a telecommunications network 300 may be routed to the shared EFS 326 for further routing by the EFS to consolidate the two networks. Also, although illustrated and discussed as consolidating two networks, it should also be appreciated that any number of distinct networks may be in communication with the shared EFS 326 for consolidating any number of networks into an overall managed telecommunications network 300.

The shared EFS 326 can route communications from network A 302 and network B 304. Thus, the EFS 326 may maintain one or more routing tables for routing communications. The EFS 326 may route a received communication to an end destination based on the dialed telephone number associated with communication. For example, if the dialed telephone number is associated with customer destination A 314, the EFS 326 routes the communication to media gateway 327 for connection to customer destination A 314. To route the communication, the EFS 326 may store or otherwise have access to the routing information from the routing engine 322 of network A 302 and the routing engine 324 of network B 304. However, as mentioned above, the telecommunications network 300 may transmit a toll-free communication through either network A 302 or network B 304, such as in the case where a disaster recovery feature is provided to a customer. This circumstance may create a conflict in the EFS 326 when routing the received communication. Several approaches to resolving this conflict in the routing of the communication through the EFS 326 are thus provided and described below.

In one implementation, duplicate entries in the routing database maintained by the EFS 326 may be noted and one of the duplicated entries may be removed. For example, both the routing engine 322 of network A 302 and the routing engine 324 of network B 304 may include an entry on where to route a received communication with a dialed telephone number. Thus, when the databases from the routing engines 322, 324 are combined, the combined database may have two entries for that particular dialed telephone number. To resolve this conflict, the EFS 326 may select which destination (either from customer destination A 314 or customer destination B 316) to route the received communication. However, this approach may include the telecommunications company contacting each customer to the network 300 to notify them of the change to the routing of received communications. In addition, this approach may also remove some disaster recovery functionality from the network 300 such that the approach is not preferred by the telecommunications company.

In another approach, the EFS 326 may be configured to run or execute two separate applications, one to route communications received from network A 302 and the other to route communications received from network B 304. The routing databases for the networks 302, 304 may be maintained and provisioned separately to remove the possibility of conflict between the routing databases. However, such an approach may be processor intensive for the EFS 326 and may be difficult when provisioning the networks.

In a third approach, the EFS 326 may be configured to route received communications based on the dialed telephone number and the CIC associated with the communication. In this implementation, the routing database maintained or accessed by the EFS 326 may not need to be altered from the combination of the routing engine information from the networks 302, 304. Rather, the EFS 326 may utilize the CIC of the communication to determine which of the distinct networks 302, 304 the communication should be routed through. For example and referring to the network 300 of FIG. 3A, a toll-free communication is received at the end office 308 of the PSTN 312 from the communication device 306. As explained above, the end office 308 receives a CIC 310 associated with the dialed number from the 8SMS database 310. Based on the received CIC, the end office 308 transmits the communication to network A 302 or network B 304. Once on either network, the communication may then be routed to the shared EFS 326 once the corresponding routing engine 322, 324 recognizes the communication as a toll-free communication. Also, the communication may include the dialed telephone number and the CIC that was returned from the 8SMS database 310.

The EFS 326 may route the communication to customer destination A 314 or customer destination B 316. However, in the circumstance where the same dialed telephone number is shared between the customer destinations 314, 316, the EFS 326 may include two entries in the routing database for routing based on the telephone number. In this implementation, however, the EFS 326 may then utilize the CIC of the communication to determine which customer destination to route the communication. In particular, if the CIC of the communication is associated with network A 302, the EFS 326 may determine the communication is intended for customer destination A 314. Similarly, if the CIC of the communication is associated with network B 304, the EFS 326 may determine the communication is intended for customer destination B 316. In this manner, the EFS 326 maintains the separate networks 302, 304 while also allowing for a consolidation of the two networks, as explained in more detail below. By routing the communication based on the CIC received from the 8SMS database 310, the EFS 326 may route the communication to the proper customer destination from the originally intended network, even though the networks share the routing through the EFS. Further, the communication is received by the customer in the same manner as before such that the customer experience is maintained.

In addition to maintaining the experience for the customer, utilizing the CIC and dialed telephone number to route communications through the EFS 326 allows the network 300 manager to consolidate or otherwise streamline the network. For example, FIGS. 3B and 3C are schematic diagrams illustrating a consolidated telecommunications network for providing toll-free communication services to one or more customers of the network. In particular, through the use of the shared EFS 326 component, one or more of the components of network A 302 may be removed or otherwise decommissioned from the network. This consolidation may reduce the overall size of the network 300 to be managed allowing for a more streamlined and, in some cases, more efficient network.

The EFS 326 can route communications based on the dialed telephone number and the CIC. The EFS 326 utilizes the CIC to determine from which network the communication is received. However, through a configuration of the 8SMS database 310 and the end office 308, portions of network 300 may be removed. For example, the 8SMS database 310 may be configured to return a first CIC for toll-free communications intended for customers to network A 302 and a second CIC for toll-free communications intended for customers to network B 304. The end office 308, however, may be configured to route all communications with the first CIC and the second CIC to network B 304. Thus, regardless of which CIC is returned by the 8SMS database 310, the end office 308 transmits the communication to the media gateway 320 for network B 304. The communication is then routed to the EFS 326 because the communication is a toll-free communication. The EFS 326 may then route the communication based on the CIC associated with the communication. Thus, although all toll-free communications may come to the EFS 326 through network B 304, those communications intended for customer destination A 314 may be transmitted through the media gateway 327 for network A 302 to the end customer 314.

The end office 308, in this implementation, is configured to route communications for the first CIC and the second CIC to network B 304. With this change, the media gateway 318 and routing engine 322 of network A 302 may be removed from the network 300. In one example, the media gateway 318 and routing engine 322 may be physically removed from the network 300. In other examples, the media gateway 318 and routing engine 322 may be logically removed from the flow of communications through the network or may otherwise remain connected within the network 300 but may be re-deployed for other communication flows through the network 300 or for flows with other networks. Regardless of the component use within the network 300, the shared EFS 326 allows for the consolidation of network A 302 and network B 304 within the overall network 300 to streamline or improve the efficiency of communication flows through the network.

In some instances, the toll-free communication received by either network A 302 or network B 304 may not have an associated CIC. In some circumstances, the end office 308 does not forward the CIC, received from the 8SMS database 310. The EFS 326 still must route these communications. Thus, in one implementation, the EFS 326 may assign a default CIC to the communication for further routing to either the media gateway 327 of network A 302 or media gateway 328 of network B 304. In other words, the EFS 326 can be configured to select a network to transmit toll-free communications that does not have an associated CIC or that is associated with a different CIC or CICs. Any destination network may be the default network and a corresponding CIC may be associated with the communication for routing.

Another illustration of the network 300 may be as shown in FIG. 3C. As shown, the media gateway 318 and routing engine 322 of the network 302 may be removed (physically or logically), or may be used to provide additional capacity, as needed. The media gateway 318 and routing engine 322 of the network 302 are shown with dashed lines to denote that these components have been removed. As such, any inbound toll-free communications from end office 308 to either customer destination A 314 or customer destination B 316 are all routed through media gateway 320. As explained above, all inbound toll fee communications are routed through media gateway 320 in the network configuration 300 of FIG. 3C. Thus, the EFS 226 must determine to which outbound media gateway 327, 328 to route the communications through to the customer destination A 314, or customer destination B 316. This routing can be done by the toll-free number, the CIC, or other information. However, as explained above, the inbound communication from the end office 308 does not always include the CIC. In these situations, the EFS 326 may execute other process to route the outbound communication through to the media gateways 327, 328.

The processes and components herein are different from the processes and components of the PSTN 312. In the configuration example of FIG. 3C, the provider network 331 receives inbound toll-free calls from the PSTN 312 or other provider network. The provider network or PSTN 312 may fail to provide the communication with an associated CIC. The lack of a CIC is not normally a concern for downstream receiver networks. However, when the CIC is missing from communications to the network 331, where media gateway 318 has been removed, the routing of the communication to the appropriate medial gateway 327 or media gateway 328 becomes problematic. Thus, now the receiver network 331 may have a need to access a CIC data source 330 via separate digital message to request and obtain the CIC from this different source of CIC information. This new messaging by the receiver network 331 has not been done previously because the CIC data source 330 was not accessible and there was no need to request the CIC from any source because the media gateway 318 would not have been removed from the network 331. Thus, the new request to the CIC data source 330 is different and new compared to what communications the end office 308 had or has with the 8SMS database. The new configuration and communications described herein in conjunction with FIGS. 3C, and 6A-8 provide a technical advantage over previous systems that allows the functions of components in network A 302 to be consolidated into network B 304 without losing the functionality of routing to media gateway 327. This change saves network resources and makes the system more efficient.

The EFS 326 may receive the communication, which does not include a CIC, as explained previously. Rather than insert a CIC or generate a default CIC for the communication to media gateways 327 and 328, or use the default CIC to determine the routing, the EFS 326 may access one or more databases to determine a CIC associated with the toll number received at the EFS 326. In one example, the CIC may be retrieved, with other information, from a national toll-free database 330, referred to as a CIC data source 330. This national CIC data source 330 provides at least some of the information used by the 8SMS database 310 to determine the CIC for the communication arriving at the end office 308. However, this national database 330 can include other information that is either not sent to the 8SMS database 310 or is not provided by the 8SMS database 310 to the end office 308. This additional information may be sent to the EFS 326. This other information may be a complete data schema from the CIC data source 330, including two or more CICs and other information associated with the toll-free number. As such, rather than receiving a single CIC from the 8SMS database 310 normally used to determine the routing, the EFS 226 may receive and can use all the information returned from the CIC data source 330 to determine a best routing according to predefined rules established at the EFS 326.

In some instances, the EFS 326 may access a CIC data cache 332. It may be possible to store one or more items of information from the CIC data source 330 in the data cache 332. However, the information in the CIC data source 330 may change over time, thus making information in the data cache 332 obsolete. As such, there may be predefined rules about when and how the information in data cache 332 may be used. The data cache 332 may also provide information from past routing decisions made by the EFS 326 that were associated with the particular toll-free number or other types of data that may be useful in the EFS 326 decision-making processes.

Both the CIC data source 330 and the CIC data cache 332 can be any type of database or data store that may be as described herein. These databases may be accessed through one or more communications made through a computer network (e.g., Internet) into an Application Programming Interface (API) or other system or software interface. The databases 330, 332 can be relational databases, flat file databases, object oriented databases, distributed databases, etc. The database(s) may include one or more items of hardware and software operable to receive, store, and retrieve data associated with toll-free number(s).

Figure 4:
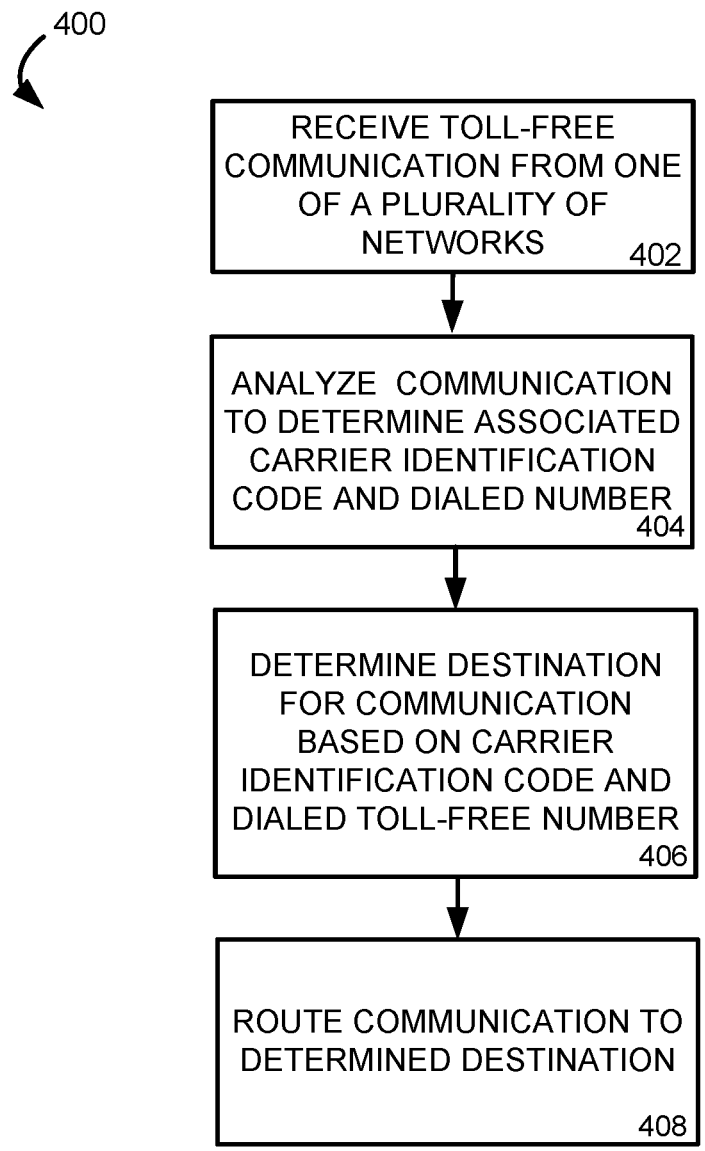
FIG. 4 is a flowchart illustrating a method, conducted by a networking device, for routing a communication utilizing a carrier identification code associated with the communication in accordance with embodiments of the present disclosure.

FIG. 4 is a method for a networking device for routing a communication utilizing a carrier identification code (CIC) associated with the communication. In one implementation, the operations of the method may be performed by an EFS, such as EFS 326, of a telecommunications network as described in FIGS. 3A and 3B. However, it should be appreciated that one or more of the operations of the method 400 may be performed by any component of the telecommunications network. Further, the operations may be performed through the execution of one or more software instructions, through one or more hardware circuits or components designed to perform the operations, or a combination of both hardware and software components.

Beginning in operation 402, the EFS 326 receives a toll-free communication from one of a plurality of telecommunication networks. For example, media gateway 318 of network A 302 of the telecommunications network 300, of FIG. 3A or 3B, may transmit the communication to the EFS 326 as described above. Alternatively, media gateway 330 of network B 304 may transmit the communication to the EFS 326. In operation 404, the EFS 326 analyzes the received communication to determine an associated CIC of the communication. The CIC may be associated with the communication by the 8SMS database 310 or the end office 308 upon receipt in a connected PSTN 312 as described above. In other examples discussed in relation to FIGS. 3C, 5B, 7, and 8, the CIC may not already be associated with the communication when the communication arrives at the EFS 326.

In operation 406, the EFS 326 associates the CIC and the destination toll-free number of the communication with a customer destination device, address, or trunk group. In general, the EFS 326 may maintain a database of CICs, dialed telephone numbers, and destinations for communications. By obtaining the dialed telephone number and CIC from the communication and associating the dialed telephone number and CIC to a destination, the EFS 326 may route the communication to the determined destination in operation 408. In one implementation, the EFS 326 may utilize a default CIC for those communications without an associated CIC. In this manner, the shared EFS 326 may receive communications from either network A 302 or network B 304 and route the communication to the desired destination. In addition, by routing the communication based at least on the CIC and the dialed toll-free number, the networks 302, 304 may be consolidated into one managed telecommunications network as each toll-free communication of the network 300 is routed through the shared EFS 326.

Figure 5A:
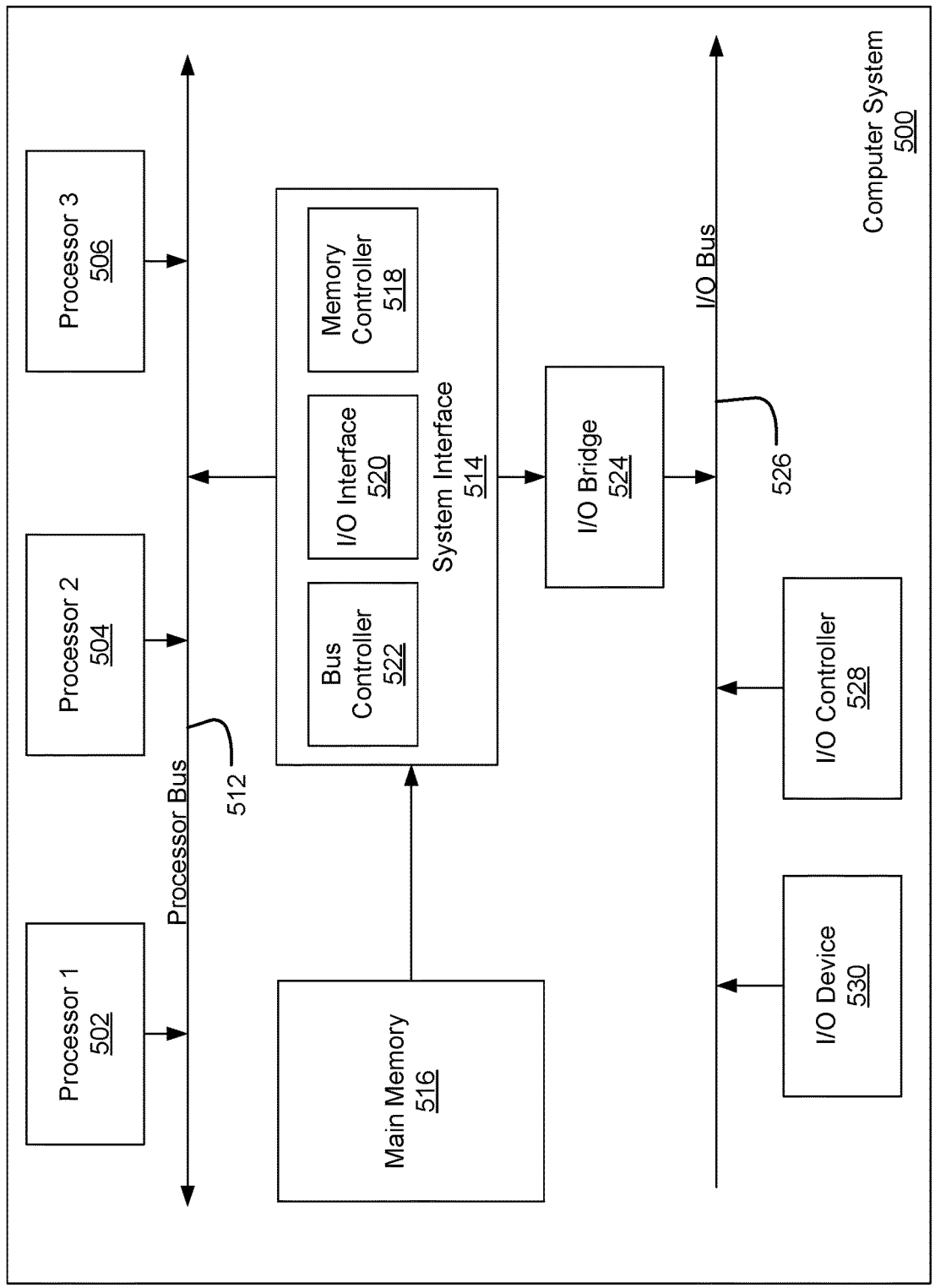
FIG. 5A is a diagram illustrating an example of a computing system which may be used in implementing embodiments of the present disclosure.

FIG. 5A is a block diagram illustrating an example of a computing device or computer system 500 which may be used in implementing the embodiments of the components of the network disclosed above. For example, the computing system 500 of FIG. 5 may be used to implement the various components of the EFS 326 discussed above. The computer system (system) can include one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514.

The system interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5A is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine-readable medium includes any tangible, non-transitory mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 5B:
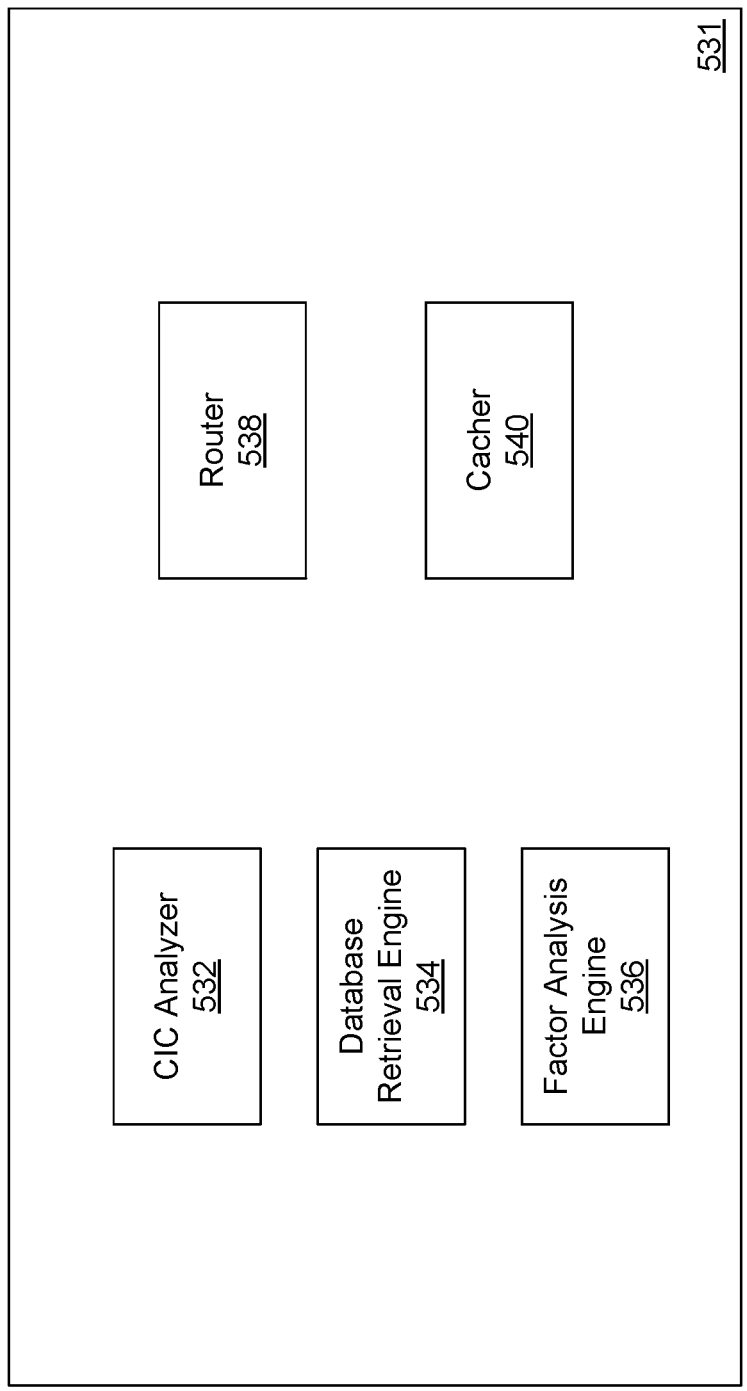
FIG. 5B is a diagram illustrating an example of software or hardware components which may be used in implementing embodiments of the present disclosure.

An embodiment of a system 531, which may be software executed by the one or more processors 502-506, may be as shown in FIG. 5B. The system 531 may be, is some implementations, constructed of one or more hardware devices, or hardware gateways in an Application Specific Integrated Circuit (ASIC), Field Programmable Gate Array (FPGA), or other hardware device or devices, such as a computer system 500. However, for description purposes herein, the system 531 is described herein as software components operating on a computing system, such as computer system 500.

The system 531 may include one or more of, but is not limited to, a CIC analyzer 532, a database retrieval engine 534, a factor analysis engine 536, a router 538, and a cacher 540. The CIC analyzer 532 can analyze the incoming message to determine if a CIC is included in that message. For example, system 531 may comprise an EFS, such as EFS 326 in FIG. 3C. If there is no CIC in the message inbound from the end office 308, or gateway 318 or 320, the CIC analyzer 532 may send that information to the database retrieval engine 534.

The database retrieval engine 534 may then send a CIC retrieval request message from the EFS 326 to a database 330 and/or 332 to retrieve information associated with the toll-free number. This retrieved information may be sent back to the data retrieval engine 534 from the databases 330, 332. The retrieved information can include a complete database schema associated with the toll-free number, which can include two or more CICs. The database retrieval engine 534 can create any message or perform any type of communications with the database 330 including interfacing with an API at the database 330, 332. A digital signal including the database retrieval operation can be sent by the database retrieval engine 534. However, the database retrieval engine 534 can conduct other types of database queries, operations, and messaging needed to retrieve information from the database 330. Further, the database retrieval engine 534 is operable to receive any type of message forms, reformat such message, or conduct other operations on the message to provide the data to the factor analysis engine 536.

The factor analysis engine 536 may be operable to review the database schema information provided by the database retrieval engine 534. The analysis is conducted to determine the best media gateway 327, 328 to which to send the message. The factor analysis can include processes to determine a percent allocation between networks 302, 304, an originating area, zone-based routing, load-balancing, or other types of single or multifactor analysis. Thus, the system 531 (e.g., EFS 326 of FIG. 3C) may conduct at least some of the analysis functions previously performed by the 8SMS database 310. Further, the factor analysis engine 86 can determine or evaluate any customer-defined database parameters or requirements. The results of the analysis, including a determined "best" gateway 327, 328, may then be sent to the router 538, to instruct the router 538 to send the message to the gateway 327, 328.

The router 538 can determine how to route the message to the media gateway 327, 328. Thus, the router 538 can form any type of communication within the networks 302, 304 from the EFS 326 to the media gateways 327, 328. The messages are then sent by the router 536 to the media gateway 327, 328 chosen to receive the message.

A cacher 540 can also receive information from the database retrieval engine 534 or send information to the database retrieval engine 534. Information from the database retrieval engine 534 may be stored by the cacher 540 into a data cache 332. The cacher 540 can also retrieve information from the data cache 332, or conduct some other database operations. In some circumstances, the cacher 540 may determine the quality or recency of the information in the data cache 332. This analysis may instruct the data cacher 540 as to whether the data within the cache 332 should be retrieved and send the helpful information to the factor analysis engine 536. The factor analysis engine 536 can use the cached information for determining a routing decision.

Figure 6A:
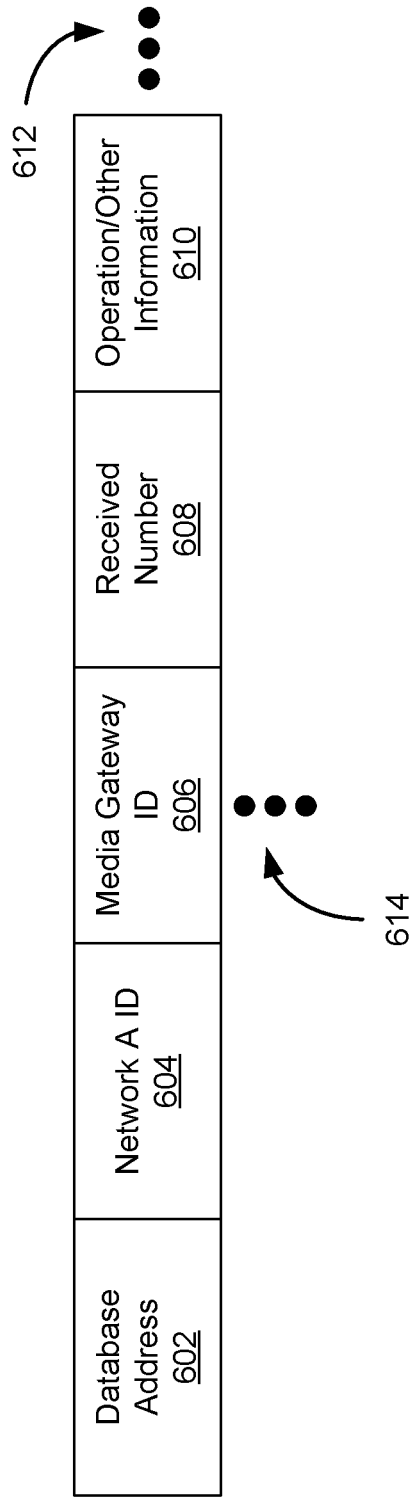
FIG. 6A is a data diagram illustrating a data structure that may be used to request a carrier identification code from a database in accordance with embodiments of the present disclosure.

A data structure that can represent the request sent to the database 330 for data about a toll-free number may be as shown in FIG. 6A. The data structure can include one or more fields. There may be more or fewer fields than that shown in FIG. 6A, as represented by ellipses 612. Each database query, sent to the database 330, may have a separate database structure as represented by ellipses 614. The fields in the data structure, in FIG. 6A, can include one or more of, but are not limited to, the database address 602, a network identifier (ID) 604, a media gateway ID 606, a received number 608, and a database operation or other information 610.

The database address 602 can include any type of address for addressing a message from the EFS 326 to the data cache 332 and/or the CIC data source 330. This address 602 can include a uniform resource locator (URL) or some other type of address to send the database query to the database 330, 332.

The network ID 604 is an identifier for the network 302, 304, which is associated with the request sent by the EFS 326. This network ID 604 identifies the EFS 326 as the sender. The media gateway ID 606 can be the ID of the gateway 318, 320, which received the message. This gateway ID 606 can include a URL or some other form of ID.

The received number 608 can be the toll-free number received by the EFS 326. This received toll-free number 608 is the toll-free number that is to be associated with one or more CICs or other information by the database 330, 332. The received number 608 is received by the end office 308 and provided to the EFS 226.

The operation field 610 can be a database query or request and/or an identifier of what type of information is requested, what format the information should be returned back from the database 330, and other instructions. The other information in field 610 can include any type of metadata or other information required by the database 330, 332 to retrieve information required by the EFS 326.

Figure 6B:
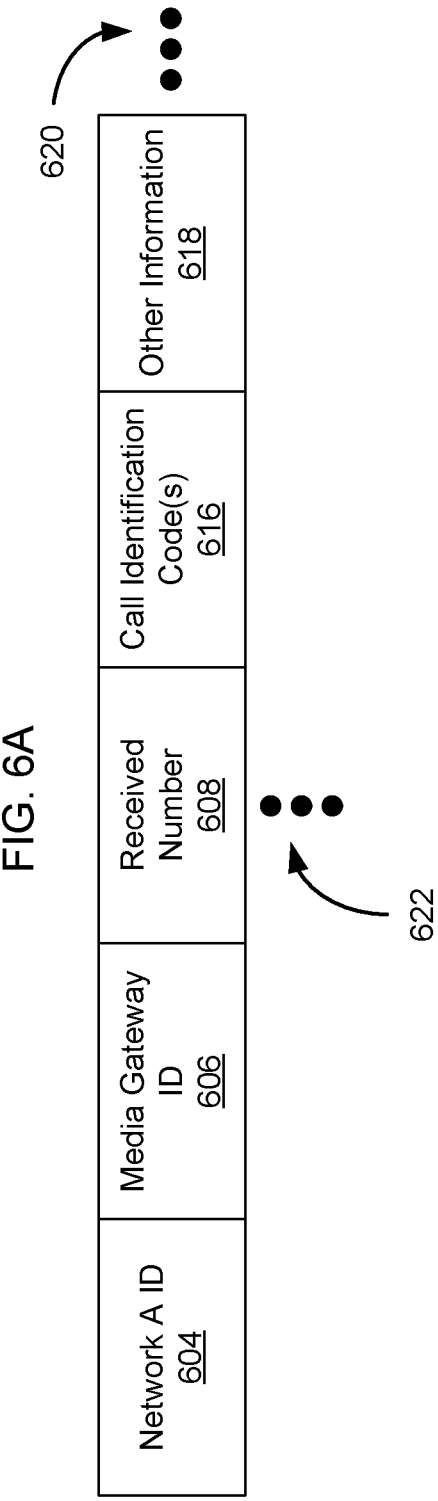
FIG. 6B is a data diagram illustrating a data structure that may provide a carrier identification code from a database in accordance with embodiments of the present disclosure.

Another data structure is shown in FIG. 6B, which may represent the data returned from the database 330, 332. The data structure of FIG. 6B may include one or more of the following fields, but is not limited to, a network ID 604, a media gateway ID 606, the received number 608, carrier identification code(s) (CICs) 616, and other information 618. There may be more or fewer fields than that shown in the data structure of FIG. 6B, as represented by ellipses 620. Each return from the database may include a different data structure, as represented by ellipses 622. The fields 604 through 608 may be the same or similar to the fields as described in conjunction FIG. 6A and therefore may not be described again here.

Carrier identification codes 616 include the one or more CICs returned from the database and associated with the toll-free number. As explained previously, there may be two or more CICs returned, which may be associated with different providers or the two or more CICs may be associated with one provider, etc. The EFS 326 may decide or determine which CIC to use for routing the communication.

Other information 618 can include any other information associated with the data schema returned from the database 330, 332. This other information can include, for example, percent allocations of CICs assigned previously, areas of origination of the toll free calls, the LATA or other network or zone-based information, or other types of information that may be associated with the toll-free number. In at least some circumstances, the database 330, 332 returns the entire data set schema associated with the toll-free number. In this example, the database 330, 332 does not return or select specific CICs to be returned to the EFS 326 (as is the case with the 8SMS database 310), but provides all information stored in the database 330, 332. Receiving the entire data schema allows the EFS 326 to determine which CIC to use and thus, ultimately, how to route the communication based on the returned information.

Figure 6C:
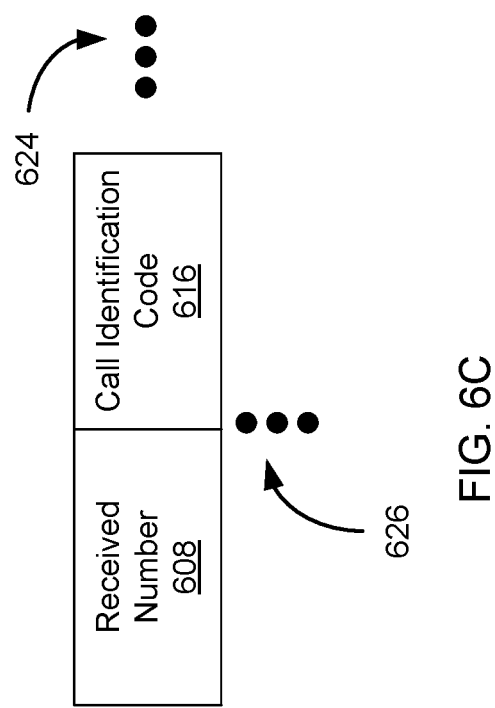
FIG. 6C is a data diagram illustrating a data structure that is used to route a communication in accordance with embodiments of the present disclosure.

Yet another data structure is shown in FIG. 6C. The data structure shown in FIG. 6C may be associated with the final determination of which CIC is associated with the received number for routing. The data structure in FIG. 6C can include one or more of, but is not limited to, a received number field 608 and a CIC code 616. There may be more or fewer fields than that shown in FIG. 6C, as represented by ellipses 624. Further, each determined routing of a toll-free number may have a different data structure, as represented by ellipses 626. Both the received number 608 and the CIC code 616 may be the same or similar to fields as described in conjunction FIG. 6A or 6B. As such, those fields may not be explained further. However, it should be noted that the CIC code 616, in FIG. 6C, includes a single CIC code that was selected by the EFS 326 for routing the communication, but that the CIC code(s) 616, provided in data structure 6B, may include two or more CIC codes.

Figure 7:
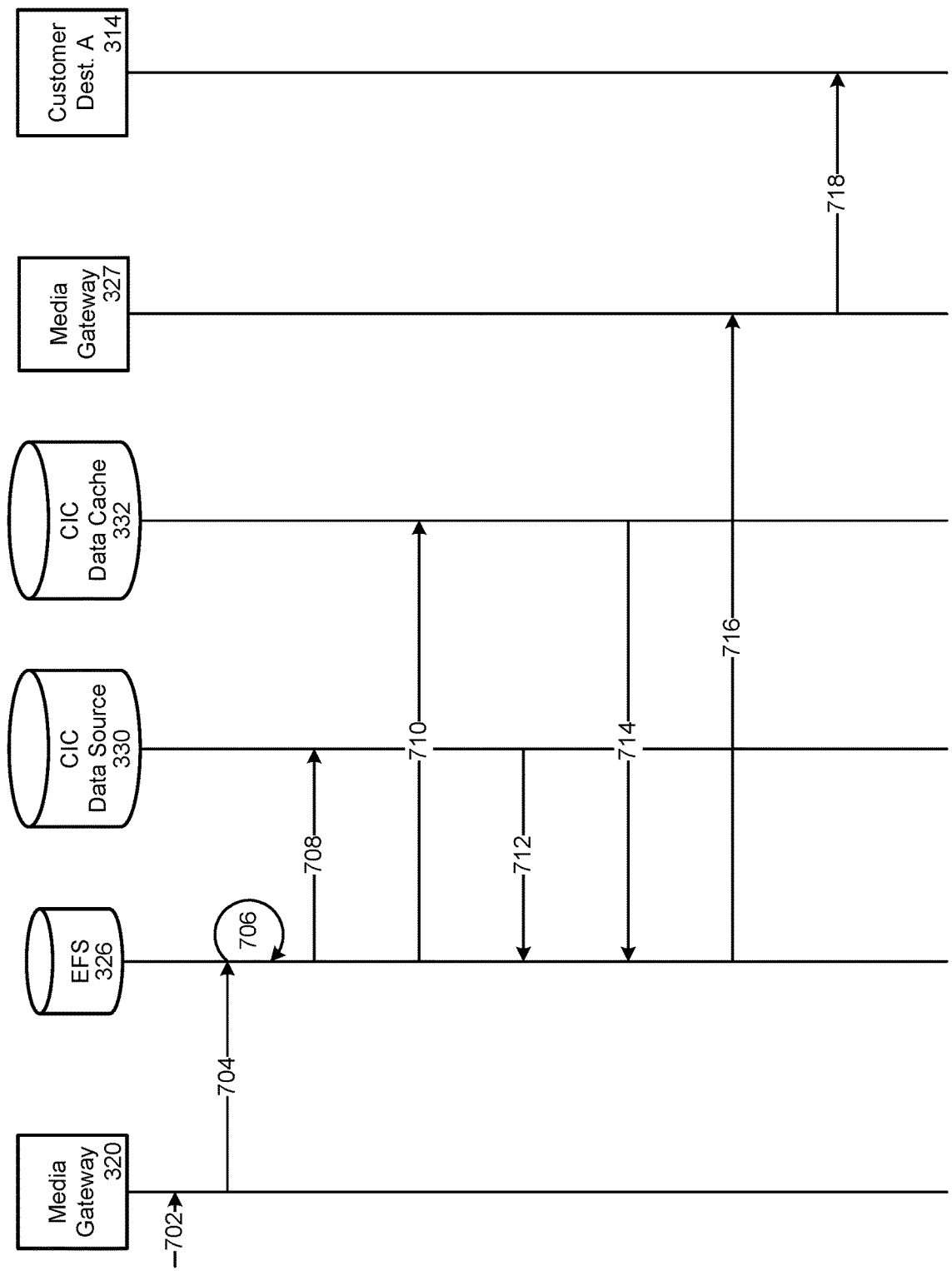
FIG. 7 is a signaling diagram illustrating a signaling process to route a communication in accordance with embodiments of the present disclosure.

An example communication and signaling process may be as shown in FIG. 7. In signal 702, the end office 308 sends a communication to the media gateway 320, which receives the communication. The communication is forwarded, from the media gateway 320 to the EFS 326, as signal 704. The EFS 326 can check whether the signal 704 includes a CIC in the communication. This analysis determines whether a CIC should be requested from the data source 330. If no CIC is provided in the communication 704, the EFS 326, in signal 708, can request information about the toll-free number from the data source 330. Signal 708 may contain the data structure as shown in FIG. 6A. In some configurations, the EFS 326 may also send signal 710 to the CIC data cache 332. In some situations, the EFS 326 may send both signal 708 and 710 to the CIC data source 330 and the CIC data cache 332 to retrieve information from both data sources.

The CIC data source 330 may return whatever information or data schema, stored by the CIC data source 330, to the EFS 326, in signal 712. The signal 712 may contain the data structure as described in conjunction with FIG. 6B. The CIC data cache 332 may retrieve previously used CICs or some other types of information that may be useful to the EFS 326 for determining a routing decision. This cached information may be returned to the EFS 326, in signal 714. The EFS 326 may then determine how to route the communication by choosing a particular CIC based on the data schema returned from CIC data source 330, and, in some circumstances, the information from the data cache 332. This routing may be as represented by signal 716 to the media gateway 327. The signal 716 may contain the data structure as described in conjunction with FIG. 6C. The EFS 326 may send signal 716 to other media gateways, but media gateway 327 is presented only as an example. The media gateway 327 may then route the signal 718 to the customer destination 314, as signal 718.

Figure 8:
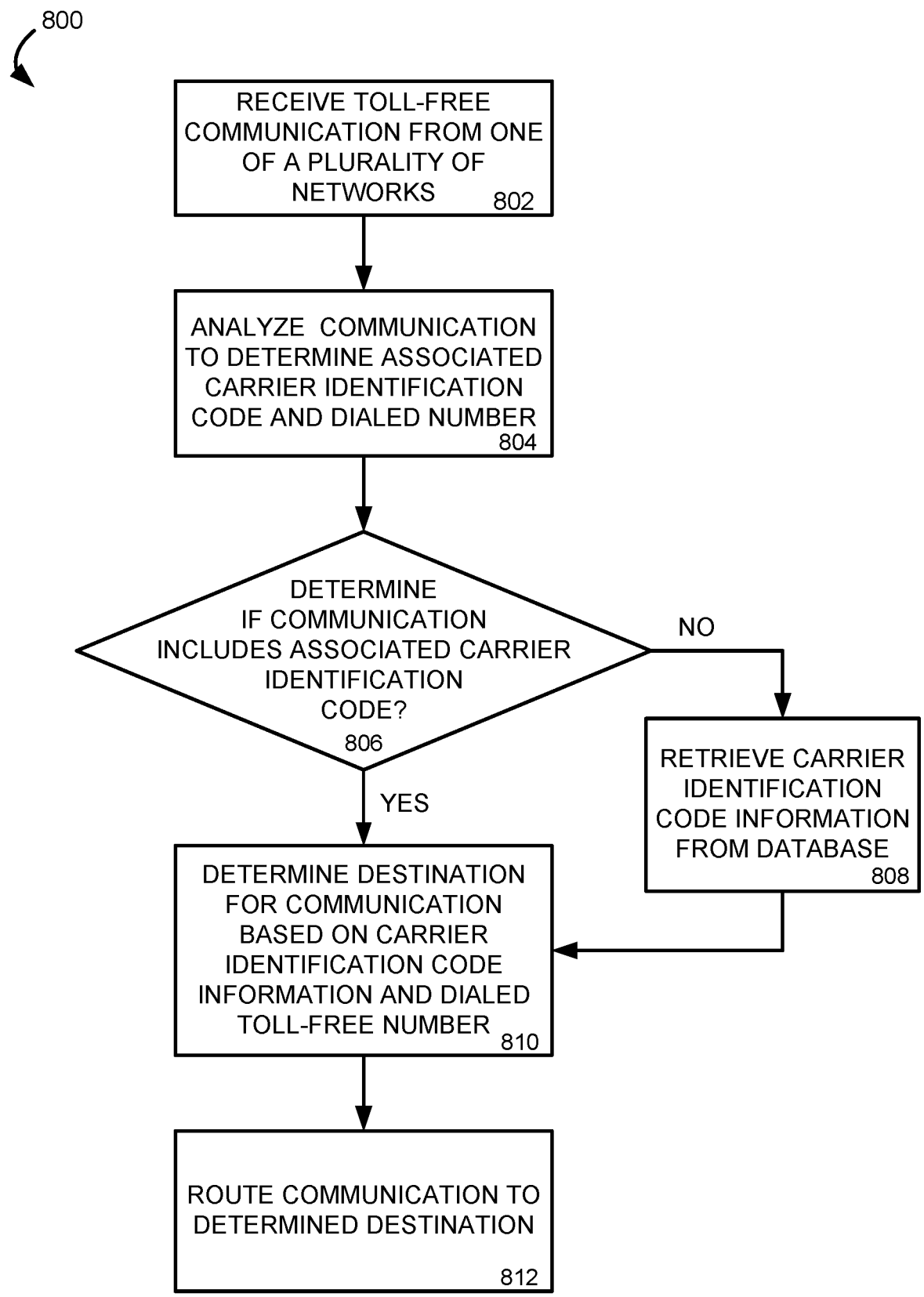
FIG. 8 is a flowchart illustrating a method, conducted by a networking device, for routing a communication utilizing a carrier identification code retrieved from a database and associated with the communication in accordance with embodiments of the present disclosure.

FIG. 8 is a method for a networking device for routing a communication utilizing a carrier identification code chosen by the EFS 326. In one implementation, the operations of the method may be performed by an EFS 326 of a telecommunications network. However, it should be appreciated that one or more of the operations of the method 800 may be performed by any component of the telecommunications network. Further, the operations may be performed through the execution of one or more software instructions, through one or more hardware circuits or components designed to perform the operations, or a combination of both hardware and software components.

Beginning in operation 802, a toll-free communication is received from one of a plurality of telecommunication networks. For example, the end office 308 may receive a toll-free communication from a customer device 306. The end office 308 may request a CIC for the toll-free communication from the 8SMS database 310. The end office 308 may receive the CIC for the toll-free communication but not include the CIC in the communication that is then forwarded to the media gateway 320. The end office 308 may then forward the toll-free communication, as signal 702, to a media gateway 320 that receives toll free communication for both network A 302 and network B 304 of the telecommunications network 300 of FIG. 3. As the communication is a toll-free communication, the media gateway 320 may transmit the communication, as signal 704, to the EFS 326 as described above.

In operation 804, the received communication is analyzed, e.g., by the CIC analyzer 532 of the EFS 326, to determine an associated CIC of the toll-free communication. In this example, the CIC was not associated with the toll-free communication, by the 8SMS database 310 or the end office 308, in the PSTN 312, as described above. In operation 806, tit is determined, e.g., by the CIC analyzer 532 of the EFS 326, whether the communication received from the media gateway 320 includes an associated a CIC. Some communications received from the end office 308 may not include a CIC, as explained previously. For example, 15% to 20% of communications may not include such CIC. With the lack of a CIC code, the EFS 326 may have a more difficult time trying to route communications inbound from a single media gateway 320 that receives messages for two networks, e.g., network A 302 and network B 304, after the media gateway 318 and routing engine 322 of network A 302 were eliminated or consolidated from the network 300. Further, the EFS 326 may experience difficulties routing the signal without the CIC, and thus, a CIC is useful in the routing decision. As such, the EFS 326 performs most optimally with a CIC code provided or determined to determine the best routing for a communication. If there is no CIC within the communication, the process 800 proceeds "NO" to operation 808. In contrast, if a CIC is provided within the communication, the process 800 proceeds "YES" to step 810.

In operation 808, an indication is received, e.g., by the database retrieval engine 534 from the CIC analyzer 532 that the toll-free communication does not include a CIC. In this example, the database retrieval engine 534 can retrieve CIC information from a CIC data source 330. The database retrieval engine 534, of the EFS 326, can request information from the CIC data source 330. In this example, the database retrieval engine 534, of the EFS 326, may send a communication, as signal 708, containing the data structure as described in conjunction with FIG. 6A, and containing a request for information that is associated with the toll-free number to the CIC data source 330. As explained previously, CIC data source 330 may be a national database for toll-free numbers, which provides the information to the 8SMS database 310. The information in the CIC data source 330 can include more information than one CIC code associated with the toll-free number, as normally returned by the 8SMS database 310. The CIC data source 330 can respond to the request by sending a data schema including one or more CICs and other information back to the database retrieval engine 534, of the EFS 326, as signal 712, which can include the data structure as described in conjunction with FIG. 6B. This information may then be sent to and used by the factor analysis engine 536, of the EFS 326, to determine the destination routing for the toll-free communication, in step 810.

In some circumstances, the database retrieval engine 534 of the EFS 226 may also retrieve information from the CIC data cache 332. This information can include a timestamp to determine the age of the information provided within the cache 332. If the information is useful and more recently stored, then the factor analysis engine 536 of the EFS 326 may use such information for routing decision.

The factor analysis engine 536 of the EFS 326 may then conduct one or more processes to evaluate and determine, from the data schema received from the CIC data store 332, how to route the toll-free communication. There may be various types of information within a data schema to evaluate. Thus, the analysis may be multi-factor. Some type of analysis that may be conducted by the factor analysis engine 536 can include the examples that follow.

The factor analysis engine 536 can receive and analyze the past or typical percent allocations of which network (e.g., network A 302, network B 304, or other networks) typically receives the toll-free communication. In some of these allocations, other providers' networks may be indicated. For example, 33% of allocations may go to a first carrier with network A 302 and network B 304. A second allocation of 33% may go to third-party provider; however, this third party may have an affiliation with the first carrier. The last 33% of the toll-free communication may be routed to an unaffiliated carrier. These typical allocations may be used as consideration by the factor analysis engine 536 to determine the routing of the toll-free communication. Thus, the factor analysis engine 536 may choose a CIC with the highest or lowest typical allocation. However, if the CIC is associated with an unaffiliated carrier, that allocation may be ignored, and the factor analysis engine 536 can choose a network within the control or affiliation of the EFS 326.

Other data that the CIC data source 330 may provide is the typical originating area of the toll-free communication, or the actual originating area may be determined from the toll-free communication itself. The originating area can include information about a geographical location, a network location, an originating carrier, or the like. The factor analysis engine 536 may match this information with a network that is in physical or logical proximity to the originating area. Such a consideration reduces the load across the network 300.

Similarly, the factor analysis engine 536 may consider the local access and transport area (LATA) or zone-based information. The LATA or zone-based information may also include information about a geographical location, a network location, an originating carrier, or the like. Thus, the factor analysis engine 536 may match this information with a network that is in physical or logical proximity to the originating area. Such a consideration also reduces the load across the network 300

Another factor that the toll-free communication may consider is load balancing. Network A 327 and network B 328 may have disproportionate traffic volumes. Thus, if, for example, network A 327 has 50% more traffic volume than network B 328, the factor analysis engine 536 may determine that the CIC for network B 328 should be chosen. The factor analysis engine 536 can also consider the loads of other network components, in the network 300, or components upstream of the network 300.

The factor analysis engine 536, of the EFS 326, can consider one, some, or all these factors. Further, these examples above are not exhaustive. The factor analysis engine 536 can consider more or fewer factors than those described herein. Therefore, the decision, by EFS 326, can be a multifactor decision as to which media gateway to send the communication. The factor analysis engine 536 can determine a weighted average for the factors or employ another algorithm to determine the CIC to associate with the toll-free communication. Further, when no CIC can be retrieved, in operation 808, and/or cannot be located or retrieved from other sources, the factor analysis engine 536 may also provide or assign a default CIC for the communication, as described above.

In operation 810, the router 538, of the EFS 326, associates the determined or default CIC and the destination toll-free number of the communication with a customer destination device, address, or trunk group. The EFS 326 may maintain a database of CICs, dialed telephone numbers, and destinations for communications. By obtaining the dialed telephone number and determining or assigning the CIC for the communication and associating the dialed telephone number and the determined or assigned CIC to a destination, the router 538, of the EFS 326, may then route the communication to the determined destination in operation 812.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Aspects of the present disclosure comprise a telecommunications network comprising: at least one application server for receiving communications from a plurality of telecommunication networks, the at least one application server comprising instructions stored thereon that, when executed by the at least one processor, perform the operations of: receiving an incoming communication comprising a dialed telephone number associated with a client of the telecommunications network and without a carrier identification code (CIC); obtaining the dialed telephone number from the incoming communication; requesting information from a CIC data source; receiving a data schema associated with the dialed telephone number; analyzing the data schema; determining a CIC to associate with the dialed telephone number based on the analysis of the data schema; identifying a destination device of the client of the telecommunication network based at least on the dialed telephone number and the determined CIC, the destination device in communication with at least one of the plurality of telecommunication networks; and transmitting the incoming communication to the destination device of the client of the telecommunication network through the at least one of the plurality of telecommunication networks.

Any of the one or more above aspects, wherein the incoming communication is a toll-free communication.

Any of the one or more above aspects, wherein the determined CIC is associated with a first network of the plurality of telecommunication networks.

Any of the one or more above aspects, wherein the determined CIC is determined based on two or more factors in the data schema.

Any of the one or more above aspects, wherein the determined CIC is determined based at least on an originating area for the incoming communication.

Any of the one or more above aspects, wherein the determined CIC is determined based at least on a typical percent allocation.

Any of the one or more above aspects, wherein the determined CIC is determined based at least on load balancing.

Any of the one or more above aspects, wherein the determined CIC is determined based at least on a local access and transport area (LATA) or zone-based information.

Any of the one or more above aspects, wherein the database schema includes two or more CICs.

Aspects of the present disclosure further comprise a feature server of a telecommunications network comprising: a network interface to receive a plurality of incoming communications from a plurality of telecommunication networks, at least one incoming communication comprising a dialed telephone number associated with a client of the telecommunications network and without a carrier identification code (CIC); a processing device to: obtain the dialed telephone number from the incoming communication; request information from a CIC data source associated with the dialed telephone number; receive a data schema associated with the dialed telephone number; analyze the data schema; determine a CIC to associate with the dialed telephone number based on the analysis of the data schema; associate the determined CIC with the at least one incoming communication, and wherein the processing device is in communication with a routing table database comprising a correlation of the dialed telephone number and the determined CIC from the at least one incoming communication with a destination device of the client of the telecommunication network; identify the destination device of the client of the telecommunication network based at least on the dialed telephone number and the determined CIC; and a transmitting component for transmitting the at least one incoming communication to the destination device of the client of the telecommunication network through at least one of the plurality of telecommunication networks.

Any of the one or more above aspects, wherein the database schema includes two or more CICs from which to choose for the determined CIC.

Any of the one or more above aspects, wherein the determined CIC is determined based on two or more factors in the data schema.

Any of the one or more above aspects, wherein the processing device further stores a routing table from the at least one of the plurality of telecommunication networks in the routing table database.

Any of the one or more above aspects, wherein the determined CIC is determined based at least on one of an originating area for the incoming communication, a typical percent allocation, load balancing, or a local access and transport area (LATA) or zone-based information.

Aspects of the present disclosure further comprise a method for operating a telecommunications network, the method comprising: receiving an incoming communication at an application server for receiving communications from a plurality of telecommunication networks, the incoming communication comprising a dialed telephone number associated with a client of the telecommunications network and without a carrier identification code (CIC); obtaining the dialed telephone number from the incoming communication; requesting information from a CIC data source associated with the dialed telephone number; receiving a data schema associated with the dialed telephone number, wherein the data schema includes two or more CICs associated with the dialed telephone number; analyzing the data schema; determining one of the two or more CICs to associate with the dialed telephone number based on the analysis of the data schema; associating the determined CIC with the incoming communication; identifying a destination device of the client of the telecommunication network based at least on the dialed telephone number and the determined CIC, the destination device in communication with at least one of the plurality of telecommunication networks; and transmitting the incoming communication to the destination device of the client of the telecommunication network through the at least one of the plurality of telecommunication networks.

Any of the one or more above aspects, wherein the incoming communication is a toll-free communication.

Any of the one or more above aspects, wherein the determined CIC is associated with a first network of the plurality of telecommunication networks.

Any of the one or more above aspects, wherein the determined CIC is determined based at least on one of an originating area for the incoming communication, a typical percent allocation, load balancing, or a local access and transport area (LATA) or zone-based information.

Any of the one or more above aspects, wherein the incoming communication did not include a CIC because an End Office opted not to provide the CIC for the incoming communication.

Any of the one or more above aspects, wherein the determined CIC is determined from a weighted average of a plurality of factors in the data schema.

We claim:

1. A telecommunications network comprising:
    at least one application server for receiving communications from a plurality of telecommunication networks, the at least one application server comprising instructions stored thereon that, when executed by the at least one processor, perform the operations of:
    receiving, from an end office, an incoming communication comprising a dialed telephone number associated with a client of the telecommunications network and without a carrier identification code (CIC);
    obtaining the dialed telephone number from the incoming communication;
    requesting information from a CIC data source;
    receiving a data schema associated with the dialed telephone number;
    analyzing the data schema;
    determining a CIC to associate with the dialed telephone number based on the analysis of the data schema, wherein the determined CIC is determined based on two or more factors in the data schema including at least load balancing across two or more of the plurality of telecommunication networks;
    identifying a destination device of the client of the telecommunication network based at least on the dialed telephone number and the determined CIC, the destination device in communication with at least one of the plurality of telecommunication networks; and
    transmitting the incoming communication to the destination device of the client of the telecommunication network through the at least one of the plurality of telecommunication networks.

2. The telecommunications network as recited in claim 1, wherein the incoming communication is a toll-free communication.

3. The telecommunications network as recited in claim 1, wherein the determined CIC is associated with a first network of the plurality of telecommunication networks.

4. The telecommunications network as recited in claim 1, wherein the determined CIC is determined based at least on an originating area for the incoming communication.

5. The telecommunications network as recited in claim 1, wherein the determined CIC is determined based at least on a typical percent allocation.

6. The telecommunications network as recited in claim 1, wherein the determined CIC is determined based at least on a local access and transport area (LATA) or zone-based information.

7. The telecommunications network as recited in claim 1, wherein the database schema includes two or more CICs.

8. A feature server of a telecommunications network comprising:

a network interface to receive a plurality of incoming communications from a plurality of telecommunication networks, at least one incoming communication, received from an end office, comprising a dialed telephone number associated with a client of the telecommunications network and without a carrier identification code (CIC);

a processing device to:

obtain the dialed telephone number from the incoming communication;

request information from a CIC data source associated with the dialed telephone number;

receive a data schema associated with the dialed telephone number;

analyze the data schema;

determine a CIC to associate with the dialed telephone number based on the analysis of the data schema, wherein the determined CIC is determined based on two or more factors in the data schema including at least load balancing across two or more of the plurality of telecommunication networks;

associate the determined CIC with the at least one incoming communication, and wherein the processing device is in communication with a routing table database comprising a correlation of the dialed telephone number and the determined CIC from the at least one incoming communication with a destination device of the client of the telecommunication network;

identify the destination device of the client of the telecommunication network based at least on the dialed telephone number and the determined CIC; and a transmitting component for transmitting the at least one incoming communication to the destination device of the client of the telecommunication network through at least one of the plurality of telecommunication networks.

9. The feature server as recited in claim 8, wherein the database schema includes two or more CICs from which to choose for the determined CIC.

10. The feature server as recited in claim 8, wherein the processing device further stores a routing table from the at least one of the plurality of telecommunication networks in the routing table database.

11. The feature server as recited in claim 8, wherein the determined CIC is determined based at least on one of an originating area for the incoming communication, a typical percent allocation, load balancing, or a local access and transport area (LATA) or zone-based information.

12. A method for operating a telecommunications network, the method comprising:

receiving an incoming communication, from an end office, at an application server for receiving communications from a plurality of telecommunication networks, the incoming communication comprising a dialed telephone number associated with a client of the telecommunications network and without a carrier identification code (CIC);

obtaining the dialed telephone number from the incoming communication;

requesting information from a CIC data source associated with the dialed telephone number;

receiving a data schema associated with the dialed telephone number, wherein the data schema includes two or more CICs associated with the dialed telephone number;

analyzing the data schema;

determining one of the two or more CICs to associate with the dialed telephone number based on the analysis of two or more factors in the data schema including at least load balancing across two or more of the plurality of telecommunication networks;

associating the determined CIC with the incoming communication;

identifying a destination device of the client of the telecommunication network based at least on the dialed telephone number and the determined CIC, the destination device in communication with at least one of the plurality of telecommunication networks; and transmitting the incoming communication to the destination device of the client of the telecommunication network through the at least one of the plurality of telecommunication networks.

13. The method as recited in claim 12, wherein the incoming communication is a toll-free communication.

14. The method as recited in claim 12, wherein the determined CIC is associated with a first network of the plurality of telecommunication networks.

15. The method as recited in claim 12, wherein the determined CIC is determined based at least on one of an originating area for the incoming communication, a typical percent allocation, or a local access and transport area (LATA) or zone-based information.

16. The method as recited in claim 12, wherein the incoming communication did not include a CIC because an End Office opted not to provide the CIC for the incoming communication.

17. The method as recited in claim 12, wherein the determined CIC is determined from a weighted average of a plurality of factors in the data schema.

* * * * *